Patented Dec. 27, 1938

2,141,477

UNITED STATES PATENT OFFICE 2,141,477

PROCESS OF PREPARING ALUMINUM SALTS OF LOWER ALIPHATIC ACIDS

Josef Lösch, Knapsack, near Cologne-on-the-Rhine, Germany, assignor to Aktiengesellschaft für Stickstoffdunger, Knapsack, near Cologne-on-the-Rhine, Germany No Drawing. Application March 9, 1937, Serial No. 129,943. In Germany July 7, 1934

7 Claims. (Cl. 260—448)

The present invention relates to a process of preparing neutral aluminum salts of lower aliphatic carboxylic acids.

It has hitherto not been possible to prepare the neutral aluminum salts of carboxylic acids by a simple reaction of aluminum with the corresponding pure carboxylic acids.

These salts have hitherto been obtained only by complicated methods; in most cases it has, however, not been possible to obtain a neutral aluminum salt free from basic salt.

Now I have found that the aluminum salts of carboxylic acids may be obtained by heating metallic aluminum with the carboxylic acid by the addition of a carboxylic anhydride to the acid apparently because by the carboxylic anhydride a considerable activity towards aluminum is imparted to the carboxylic acid. For the starting of the reaction very small quantities of anhydride generally suffice. For the preparation of aluminum acetate for instance an addition of 0.1 to 1 per cent. of acetic anhydride, calculated upon the acetic acid used, is sufficient in order to form the aluminum acetate.

It could not be foretold that by this simple method it would be possible to obtain the neutral aluminum salts of carboxylic acids, because even heated aluminum is not attacked by pure carboxylic acid or by pure carboxylic anhydride. It is not necessary that the carboxylic anhydride should be derived from the carboxylic acid used for preparing the salt. If the anhydride of a carboxylic acid other than that for making the salt is used, it is advisable to use the anhydride of an acid with fewer carbon atoms than are present in the acid from which the salt has to be prepared. It is, for instance, possible to obtain neutral aluminum oenanthate by heating aluminum with oenanthylic or heptanoic acid and small quantities of acetic anhydride. When preparing the aluminum salts of carboxylic acids of high molecular weight from which the corresponding anhydrides can be prepared only with difficulty it may be particularly desirable to use the anhydrides of carboxylic acids of low molecular weight as activating agents.

It is advantageous to use the carboxylic acid in excess because the aluminum salt obtained in the form of a powder can very readily be removed from the reaction vessel and the excess of acid then used for a new batch.

As the carboxylic anhydride has only an activating action and is practically not consumed, the process is particularly economical. Very large quantities of aluminum salts may be prepared with a given quantity of anhydride.

The aluminum salts obtained according to the present process are distinguished by a particular purity and contain neither a basic salt nor a free acid. They are stable to an unlimited extent and maintain their pulverulent form when being stored.

The aluminum salts are formed the more rapidly the higher the temperature at which the reaction occurs; for this reason it is suitable to heat the components to the boiling point of the carboxylic acid.

Contrary to the known processes in which aluminum powder is used the aluminum may also be used in the form of wastes, as turnings, tubes, sheets or plates, this being a further industrial progress.

The following examples serve to illustrate the invention but they are not intended to limit it thereto, the parts being by weight:

(1) 30 grams of aluminum waste are boiled together with 600 grams of acetic acid and 30 grams of acetic anhydride. In the course of several hours a complete reaction occurs. After the separation of the aluminum acetate produced the excess of acid is used for the reaction of further quantities of aluminum.

(2) A mixture of 1000 parts of propionic acid and 30 parts of propionic anhydride into which 100 parts of aluminum turnings have been introduced is heated to boiling until the aluminum has been transformed into pripionate. After the filtration from the aluminum salt the excess of acid is used for the reaction with further quantities of aluminum.

As the propionic anhydride is practically not consumed, a further addition of propionic acid suffices in order to form again aluminum propionate.

(3) The method of operating is the same as described in Example 1. For the preparation of neutral aluminum butyrate 1000 parts of butyric acid and 30 parts of butyric anhydride are used.

(4) A mixture of 1000 parts of oenanthic acid and 100 parts of oenanthylic or heptanoic anhydride into which 100 parts of aluminum turnings have been introduced is heated to boiling until the aluminum has been transformed into neutral aluminum oenanthate. After the salt produced has been filtered the mixture of acid and anhydride is used for a new batch.

(5) A mixture of 600 parts of butyric acid and 80 parts of acetic anhydride into which 27 parts of aluminum turnings have been introduced is heated to boiling until the aluminum has been transformed into neutral aluminum butyrate. After the salt produced has been filtered the mixture of acid and anhydride is used for a new batch.

I claim:

1. Process of preparing neutral aluminum salts of lower aliphatic acids which comprises heating metallic aluminum with a lower aliphatic acid in the presence of an anhydride of a lower aliphatic acid.

2. Process of preparing neutral aluminum salts of lower aliphatic acids which comprises heating metallic aluminum with a lower aliphatic acid in the presence of the anhydride of the same lower aliphatic acid.

3. Process of preparing neutral aluminum salts of lower aliphatic acids which compdises heating metallic aluminum with a lower aliphatic acid in the presence of a relatively small quantity of an anhydride of a lower aliphatic acid.

4. Process of preparing neutral aluminum salts of lower aliphatic acids which comprises heating metallic aluminum with an excess of a lower aliphatic acid in the presence of an anhydride of a lower aliphatic acid.

5. Process of preparing neutral aluminum acetate which comprises boiling for several hours 30 parts of aluminum turnings together with 600 parts of acetic acid and 30 parts of acetic anhydride and separating the excess of acid which may be used for the reaction of further quantities of aluminum.

6. Process of preparing neutral aluminum propionate which comprises boiling 100 parts of aluminum turnings together with 1000 parts of propionic acid and 30 parts of propionic anhydride until all of the alumnum has been dissolved, filtering and purifying the salt from the excess of acid and acid anhydride which after the addition of further quantities of acid may be used again for the reaction of further quantities of aluminum.

7. Process of preparing neutral aluminum butyrate which comprises boiling 100 parts of aluminum turnings together with 1000 parts of butyric acid and 30 parts of butyric anhydride until all of the aluminum has been dissolved, filtering and purifying the salt from the excess of acid and acid anhydride which after the addition of further quantities of acid may be used again for the reaction of further quantities of aluminum.

JOSEF LÖSCH.